(12) United States Patent
McKinny et al.

(10) Patent No.: US 9,618,634 B2
(45) Date of Patent: Apr. 11, 2017

(54) METHOD FOR GAIN MATCHING NEUTRON DETECTORS CONTAINING VARIOUS HE-3 PARTIAL PRESSURES

(71) Applicant: General Electric Company, Schenectady, NY (US)

(72) Inventors: Kevin Scott McKinny, Hudson, OH (US); Matthew Thomas McPheeters, Cleveland Heights, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 684 days.

(21) Appl. No.: 14/104,160

(22) Filed: Dec. 12, 2013

(65) Prior Publication Data
US 2016/0349384 A1    Dec. 1, 2016

(51) Int. Cl.
*G01T 3/00* (2006.01)

(52) U.S. Cl.
CPC ..................... *G01T 3/00* (2013.01)

(58) Field of Classification Search
CPC  G01T 3/00; G01T 3/008; G01T 1/185; G01T 1/18
See application file for complete search history.

(56) References Cited

U.S. PATENT DOCUMENTS

| 3,688,118 A | 8/1972 | Martina | |
|---|---|---|---|
| 2012/0119095 A1* | 5/2012 | Nabais Conde | H01J 47/06 250/366 |
| 2013/0034198 A1* | 2/2013 | Chandrasekharan | G01V 5/0091 376/159 |

OTHER PUBLICATIONS

International Search Report and Written Opinion issued in connection with corresponding PCT Application No. PCT/US2014/067000 dated Mar. 18, 2015.
Dowdy et al., "A High Efficiency Neutron Detection System for Photoreaction Studies", Nuclear Instruments and Methods, vol. No. 115, Issue No. 2, pp. 573-579, Jan. 1, 1974.
Tanaka et al., "Development of Micro-Strip Gas Detector System With Individual Readouts for Neutron Scattering Experiments", Nuclear Science Symposium Conference Record, 2005 IEEE Wyndham El Conquistador Resort, Puerto Rico Oct. 23- 29, 2005, Piscataway, NJ, USA, IEEE, vol. No. 1, pp. 612-615, Oct. 23, 2005.
Desai et al., "Performance studies on high pressure 1-D position sensitive neutron detectors", Pramana, vol. No. 71, Issue No. 5, pp. 1183-1188, Nov. 1, 2008.

* cited by examiner

*Primary Examiner* — Kiho Kim
(74) *Attorney, Agent, or Firm* — Cooper Legal Group, LLC

(57) ABSTRACT

An arrangement for detecting neutrons. The arrangement includes a first detector including helium that includes at least some Helium-3. The arrangement includes a second detector including helium that includes at least some Helium-4. The amount of all helium of the second detector is the same as the amount of all helium in the first detector. An associated method for providing the arrangement.

15 Claims, 6 Drawing Sheets

METHOD FOR GAIN MATCHING NEUTRON DETECTORS CONTAINING VARIOUS HE-3 PARTIAL PRESSURES

BACKGROUND OF THE INVENTION

Field of the Invention

The invention relates to a detector array having a plurality of detectors with at least some detectors containing Helium-3 (He-3), and specifically relates to gain matching the plurality of detectors.

Discussion of Prior Art

A neutron detector arrangement can include a plurality of separate neutron detectors. Such a neutron detector arrangement provides for the plurality of detectors to be positioned across an area, e.g., within a panel or well counter. The plurality of detectors are operatively connected to sensory and/or processing equipment, circuitry or the like. Various properties, characteristics, and other information can be discerned by the detection of neutrons by the neutron detectors.

Also, in view of the plurality of detectors it should be appreciated that the outputs of the detectors need to be calibrated or matched so that outputs of the plurality of detectors can be readily processed. In some respects, the outputs of the plurality of detectors need to have comparable values for comparable neutron activity. Comparable is meant to be identical or near-identical. Within a known approach for monitoring a plurality of detectors 10A-10N (see FIG. 1), the multiple detectors are read-out separately. Specifically, see that each of the plurality of detectors 10A-10N has its own associated amplifier (e.g., 12A-12N) and/or high voltage supply (e.g., 14). Each associated amplifier and/or high voltage supply needs to be adjusted or tuned for the output the respective detector so that matching of output per comparable neutron activity is achieved. Such adjustment is commonly referred to as gain matching.

It should be appreciated that variation in output from various detectors 10A-10N, despite comparable neutron activity, can be caused by variation of the amount of He-3 that is present within the detectors 10A-10N. Such is often referred to as variation of the partial pressure of the He-3. Further, the varied amount of He-3 may include the absence of He-3 in some of the detectors 10A-10N.

It would be beneficial to provide gain matching within a detector array with at least some He-3 containing detectors without the need/effort of adjustment to each associated amplifier and/or high voltage supply to accomplish such gain matching. Such beneficial aspect would be particularly notable for systems containing large numbers of detectors and amplifiers. As such the present inventors have realized that there is a need for improvement concerning gain matching within a detector array with at least some He-3 containing detectors.

BRIEF DESCRIPTION OF THE INVENTION

The following summary presents a simplified summary in order to provide a basic understanding of some aspects of the arrangements and/or methods discussed herein. This summary is not an extensive overview of the arrangements and/or methods discussed herein. It is not intended to identify key/critical elements or to delineate the scope of such arrangements and/or methods. Its sole purpose is to present some concepts in a simplified form as a prelude to the more detailed description that is presented later.

In accordance with one aspect the present invention provides an arrangement for detecting neutrons. The arrangement includes a first detector including helium that includes at least some Helium-3. The arrangement includes a second detector including helium that includes at least some Helium-4. The amount of all helium of the second detector is the same as the amount of all helium in the first detector.

In accordance with another aspect the present invention provides a method for providing an arrangement for detecting neutrons. The arrangement includes first and second detectors. The method includes providing the first detector with helium that includes at least some Helium-3. The method includes providing the second detector with helium that includes at least some Helium-4 such that the amount of all helium of the second detector is the same as the amount of all helium in the first detector.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
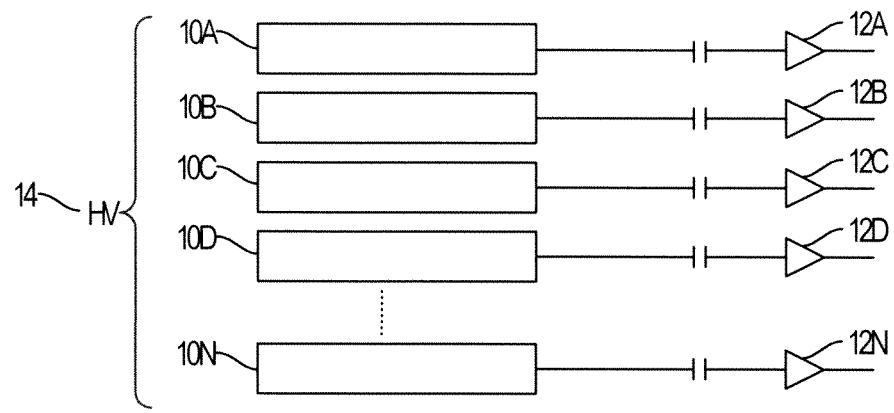
FIG. 1 is a schematic illustration of a known neutron detector arrangement having a plurality of detectors, each potentially having a varying partial pressure of Helium-3, including an absence of Helium-3, and a plurality of associated, respective amplifiers, each adjusted for gain matching based upon the associated, respective detector.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 2:
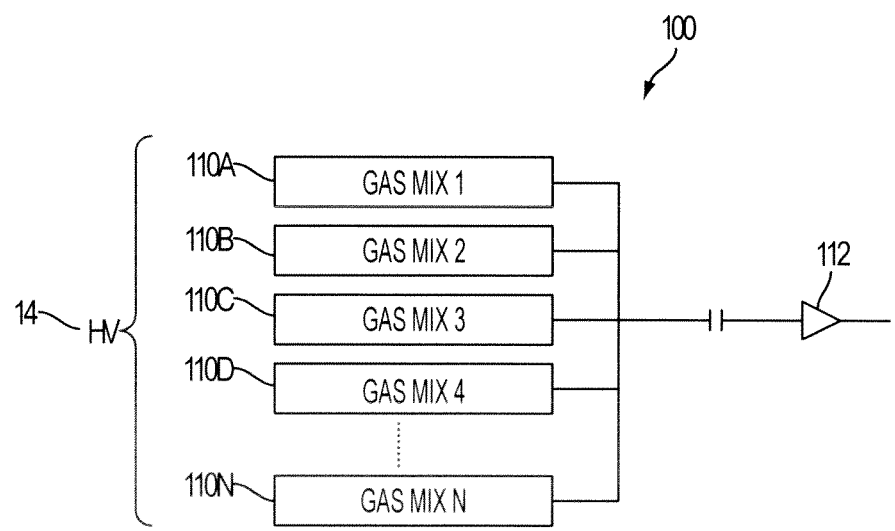
FIG. 2 is a schematic illustration of a neutron detector arrangement having a plurality of detectors, each potentially having a varying partial pressure of Helium-3, including an absence of He-3, and potentially a complementary partial pressure of Helium-4, in at least some of the detectors, in accordance with an aspect of the present invention, and a single, common amplifier.

An example of an arrangement 100 for detecting neutron activity (e.g., neutron(s) moving to detector(s) and being detected thereat—impingement) and which has at least one aspect in accordance with the present invention is schematically shown within FIG. 2. The arrangement 100 includes a plurality of detectors 110A-110N. It is to be appreciated that a generic number "N" of detectors are present and that the generic number can be any number greater than one (i.e., "N" can be any plural number). Also, it is to be appreciated that within discussion of the detectors 110A-110N, the discussion can be generic for all of the detectors and/or applicable to any of the specific detectors.

Each detector (e.g., 110A-110N) includes at least one neutron sensitive material. It is to be appreciated that within the presented example each detector (e.g., 110A-110N) includes a cathode and anode, not specifically shown, and that neutron activity (e.g., neutron(s) moving to detector(s) and being detected thereat) which cause a detectable current at the anode. For example, each neutron detectors include an anode (e.g., a wire) extending axially through a cathode shell, with an insulator separating the anode from the cathode shell. To detect neutrons, ions/particles resulting from neutron reactions within the neutron sensitive material inside the detector will collide with gas molecules within the detector to produce free electrons. These free electrons are drawn to the anode, whereupon the free electrons generate a signal/electronic pulse. This signal/electronic pulse is analyzed to determine a neutron count rate. As such, the operation of the detectors 110A-110N to detect neutron activity (e.g., neutron(s) moving to detector(s) and being detected thereat) will be well appreciated by the person of ordinary skill in the art. Of course, variations in detector construction/operation are contemplated and not limited to the presented example. For example, the detector may utilize ionization of gases containing He-3 to detect neutrons.

Figure 3:
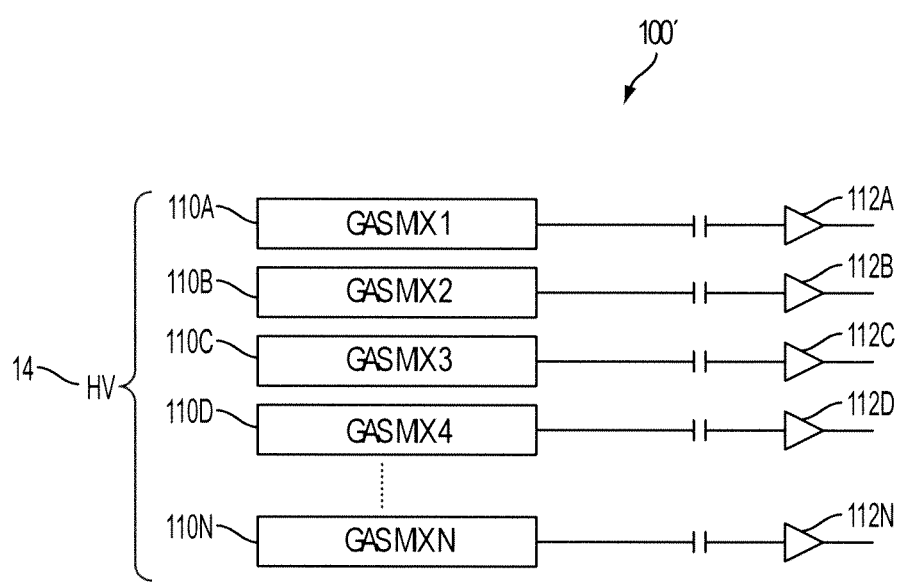
FIG. 3 is a schematic illustration of another example neutron detector arrangement having a plurality of detectors, each potentially having a varying partial pressure of Helium-3, including an absence of He-3, and potentially a complementary partial pressure of Helium-4, in at least some of the detectors, in accordance with an aspect of the present invention, and a plural amplifiers.

At least some of the detectors (e.g., 110A-110N) include at least some Helium-3 (He-3 or $^3$He). It is to be appreciated that "least some of the detectors" can be all of the detectors or can be less than all of the detectors. It is to be appreciated that it is possible that at least some (e.g., less than all) of the detectors (e.g., 110A-110N) contain no He-3. The He-3, along with any other present gas(es) that is present within detectors (e.g., 110A-110N) is bounded within a volume that is bounded by an enclosure (e.g., possibly the cathode itself). See FIGS. 3-5 for an example detector array 200 with bound volume enclosures provided as tubes. The configuration and construction (e.g., shape, size, and spacing) of the bound volume enclosures need not be specific limitation upon the present invention and thus all variations concerning the configuration and construction of the bound volume enclosures are contemplated.

It is to be appreciated that, among the plurality of detectors (FIG. 2, 110A-110N), the fill pressure values for the He-3 may vary (including zero). In other words, all/some of detectors 110A-110N may have varying amounts of He-3 (including zero). For each detector 110A-110N, it is to be appreciated that other neutron sensitive material (e.g., Boron-10 or B-10) may be present within the detector. Thus, some/all of the detectors within the array may include other neutron sensitive material. Also, for each detector 110A-110N, at least one non-neutron sensitive material, including other gas(es) may be present within the detector. In view of the possible presence of other gas(es) within each detector (e.g., 110A-110N), the amount of He-3 within each detector may provide a partial pressure. As some non-limiting examples of other gas(es) that may be present within some/ all of the detectors within the array, various combinations of stopping gases (e.g., Ar, Kr, Xe, N, etc.) and quench gases (e. $CO_2$, methane, etc.) may be present.

In view of the variation of the pressure values for the He-3 among the plurality of detectors 110A-110N, the electrical response activity (e.g., gas gain) within each detector by the present He-3 associated with a comparable neutron activity may vary. Again, recall the discussion concerning FIG. 1 in which associated amplifiers (e.g., 12A-12N) and/or high voltage supply (e.g., 14) needed to be adjusted or tuned for the output the respective detectors 10A-10N so that matching of output per comparable neutron activity was achieved. Focusing back to FIG. 2, in accordance with at least one aspect of the present invention, Helium-4 (He-4 or $^4$He) is provided within at least some of the detectors (e.g., 110A-110N), as needed, to match the gas-gain performance among the detectors 110A-110N. Again, it is to be appreciated that "least some of the detectors" can be all of the detectors or can be less than all of the detectors. It is contemplated that differing amounts of He-4, including zero, may be provided within the different detectors (e.g., 110A-110N). Note that FIG. 2 represents the possible different amounts of He-3 and/or He-4 with the different detectors 110A-110N via the different legends "GAS MIX 1" to "GAS MIX N." Each of the gas mixes may contain different amount(s) (including zero) of He-3 and/or He-4.

Turning to He-4, He-4 is a common isotope of helium and may be considered to be more readily available than He-3 and/or may be less costly than He-3. Turning to the provision (i.e., inclusion) of He-4 within at least some of the detectors 110A-110N in accordance with an aspect of the present invention, He-4 is used to equalize the total helium pressure among the detectors 110A-110N. He-4 is electronically identical to He-3. As such, with He-4 added, as needed, into each respective detector (e.g., 110A-110N) such that the total helium (He-4 and possibly He-3) in that detector is equal to the total helium (He-3 and possibly He-4) of another detector (e.g., 110A-110N), the functional characteristics of the two total helium contents, except neutron sensitivity, are same.

As an example, a prototype He-3 Hybrid scattering module contains multiple (e.g., 28 or more) detectors 110A-110N filled with X (with "X" being a first specific value) atmospheres of He-3 gas plus Y (with "Y" being a second specific value) atmospheres of $Ar/CO_2$, and contains some (e.g., 4) detectors 110A-110N without He-3 gas. It should be noted that within this example the generic number "N" is equal to 32. Again, it is to be appreciated that the generic number "N" can be any number greater than two (i.e., any plural number). If the non-He-3 detectors contain only Y atmospheres of $Ar/CO_2$, the gas gain will be different, requiring different high-voltage and/or gain settings to operate simultaneously with the He-3 filled detectors. Such a situation is avoided via use of an aspect of the present invention. By adding X atmospheres of He-4 to those detectors with no He-3, while maintaining a constant Y atmospheres of Ar/CO2, the high voltage and gain requirements of the detectors will match those of the He-3 detectors exactly. Furthermore, in the case of linear position sensitive detectors, the stopping power of the fill-gas will be matched, which will result in the same position resolution in the two subsets of detectors.

One aspect in accordance with the present invention provides an ability to add additional detectors to an existing array of detectors containing at least some detectors containing at least some He-3 gas. Another aspect in accordance with the present invention provides an ability to operate with a lesser number (e.g., a single) of high voltage and/or amplifier settings. See the example of FIG. 2, which shows a single amplifier 112 and a single high voltage 114. Another aspect in accordance with the present invention provides an ability to operate a detector array using some amount of He-4 in lieu of some amount of He-3 for each of a plurality of detectors to have equal total helium amounts.

It is to be appreciated that one or more aspects of the present invention can be utilized within other arrangements. For example, See FIG. 3 which shows an arrangement 100' that includes a plurality of amplifiers 112A-112N, one for each detector 110A-110N. Such is similar to the plural amplifiers 12A-12N as shown within FIG. 1. However, unlike the scenario of FIG. 1 that has the individual amplifiers 12A-12N of varying gain due to needed adjustments, all the amplifiers 112A-112N are of equal gain.

Figure 4:
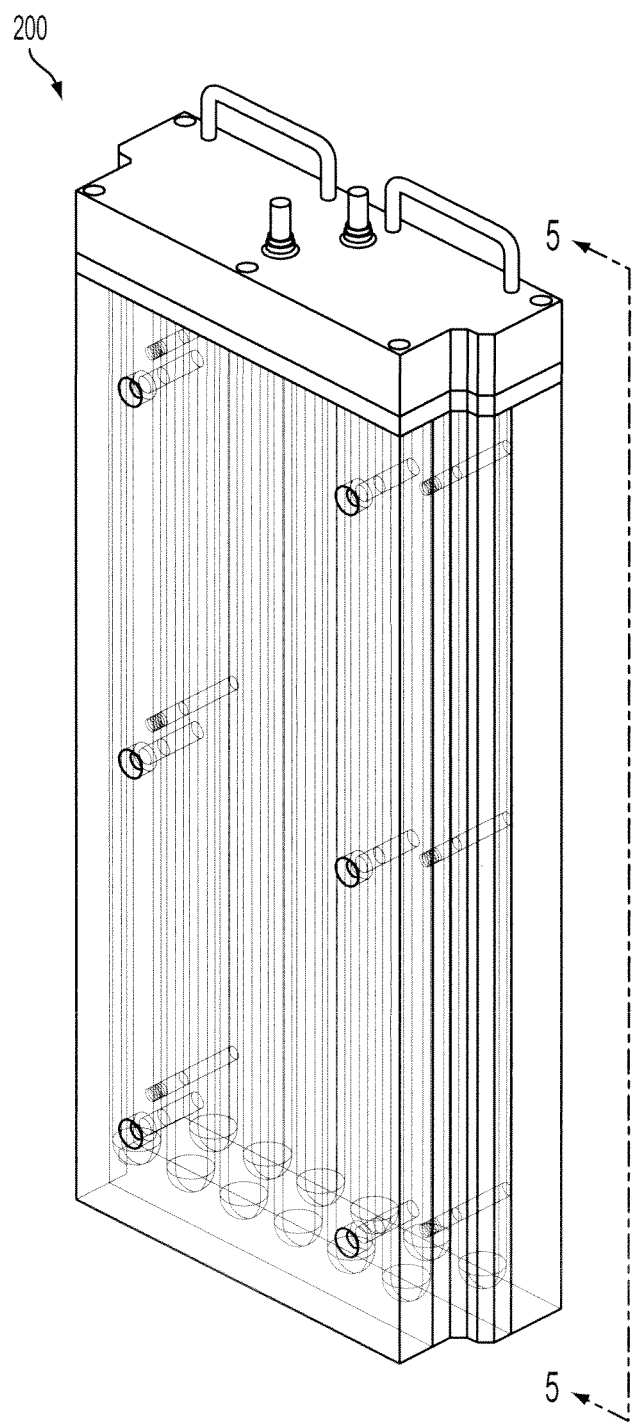
FIG. 4 is a perspective view of an example neutron detector arrangement having a plurality of detectors in a panel or well counter detector array within which an aspect of the present invention may be incorporated.
Figure 5:
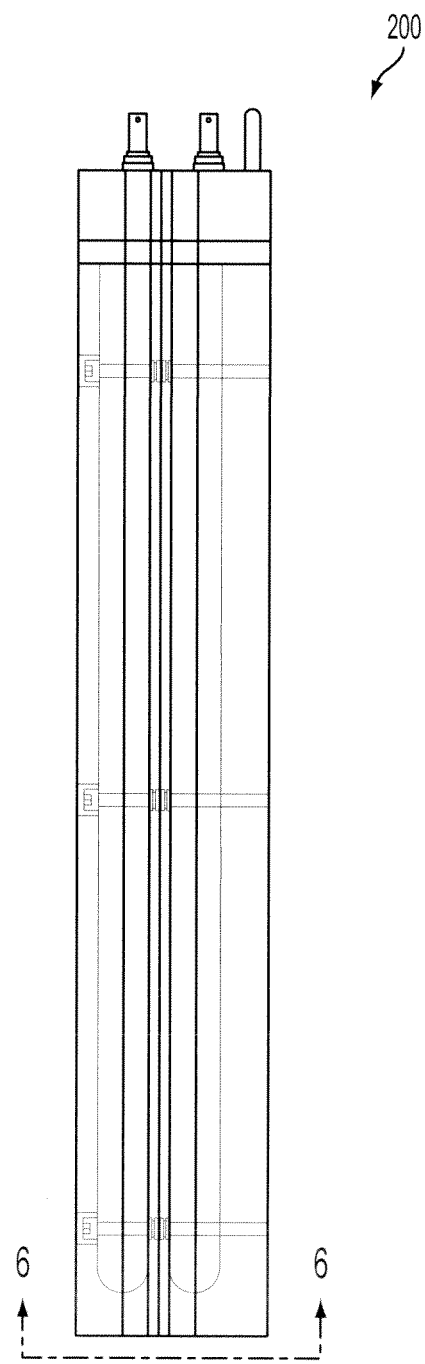
FIG. 5 is a view taken along line 5-5 of FIG. 4 of the example detector arrangement of within which an aspect of the present invention may be incorporated.
Figure 6:
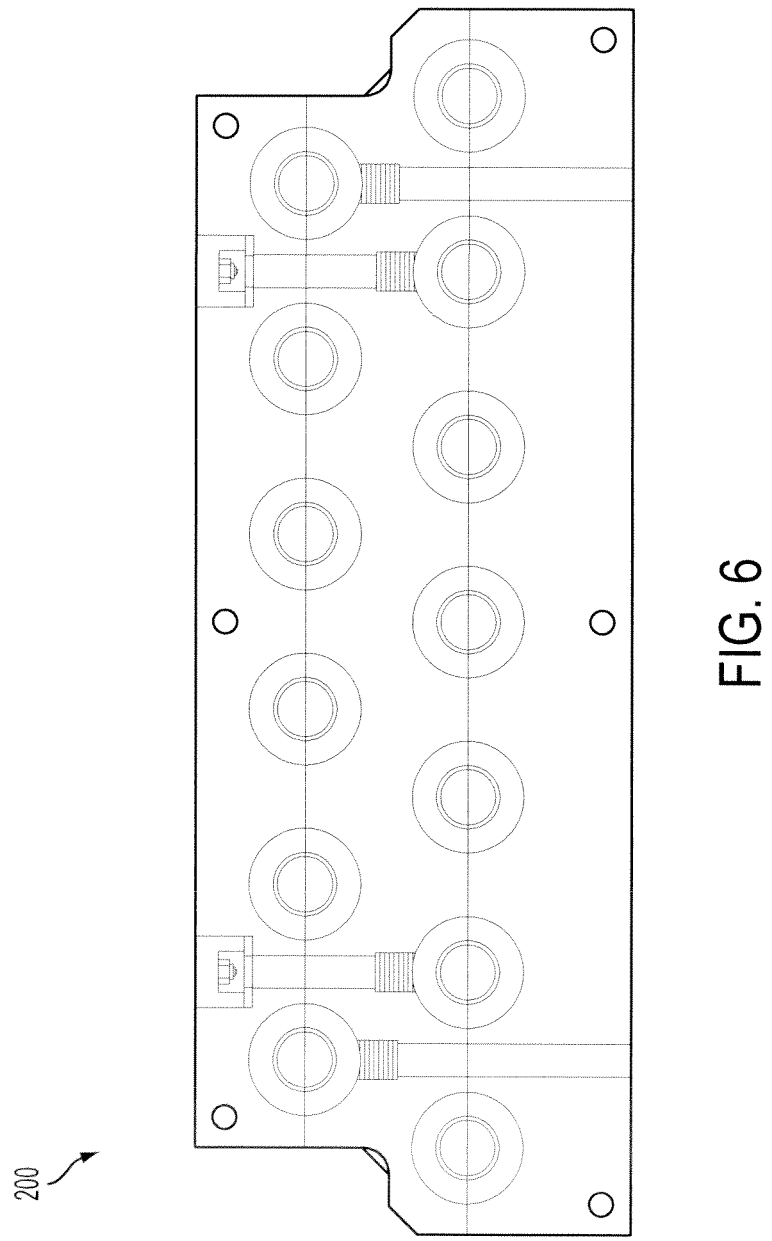
FIG. 6 is a view taken along line 6-6 of FIG. 5 of the example detector arrangement of within which an aspect of the present invention may be incorporated.

It is to be appreciated that one or more of the aspects of the present invention can be utilized within various detector arrays. FIGS. 4-6 merely show just one example. It is to be appreciated that in accordance with an aspect of the present invention, the arrangement is for detecting neutrons. The arrangement includes at least a first detector including helium that includes at least some He-3 (Helium-3), and at least a second detector including helium that includes at least some He-4 (Helium-4). The amount of all helium of the second detector is the same as the amount of all helium in the first detector. It should be appreciated that "at least some" means that the helium may be completely He-3 or He-4, respectively, or a helium mixture.

The above mentioned aspect of the invention can provide a basis to which any number of additional detectors can be provided. For example, the arrangement can include a third detector including helium that includes at least some He-4. The amount of all helium of the third detector is the same as the amount of all helium in each of the first and second detector. Still further, the third detector could include some He-3. This variation of He-3 and He-4 leads to the aspect that the He-3 and the He-4 in the various detectors can be provided in various combinations. For example, the second detector can include some He-3. As another example, the second detector includes no He-3. Further, in an example, the first detector can include some He-4. Still further, in an example, the first detector can include no He-4.

To be sure, it is to be appreciated that within the arrangement, there may be sub-group(s) or sub-array(s) of detectors that are similarly/identically configured (e.g., certain gas mixture) that may be different from other sub-group(s) or sub-array(s) of detectors. For example, a first sub-group may have a first gas mixture and a second sub-group may have a second, different gas mixture. However, the aspects of the present invention provide for overall matching of total helium within all detectors.

Figure 7:
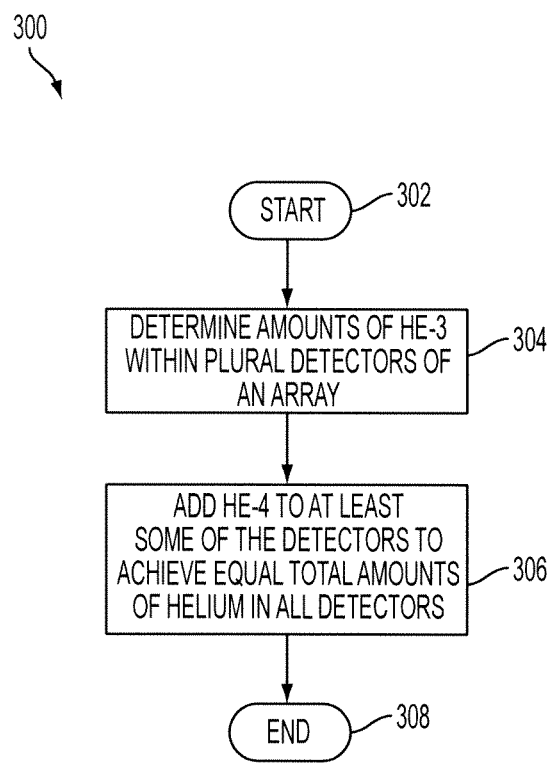
FIG. 7 is a top-level flow chart illustrating a method for providing an example neutron detector arrangement having a plurality of detectors in accordance with an aspect of the present invention.

As another aspect, the present invention provides an associated method of gain matching neutron detectors containing various He-3 partial pressures. One example, method 300 is shown within FIG. 7. It is to be appreciated that the shown method 300 is only one example and that other examples are contemplated. Also, it is to be appreciated that the show example method 300 is presented via a top-level flowchart. It is to be appreciated that various, more specific details within such a top-level flow chart method are contemplated.

The method 300 is initiated at step 302 and proceeds to step 304. At step 304, the amount of He-3 within each of a plurality of detectors of an array is determined. It is to be appreciated that the determination the amount of He-3 within each of the plurality of detectors may be via various methods. For example, the amount may be known from previous filling information. Of course, any process (e.g., prior knowledge, testing) can be used to determine the amount of He-3 within each of the plurality of detectors. The method 300 then proceeds to step 306.

At step 306, He-4 is added to at least some of the detectors to achieve equal total amounts of helium within all of the detectors. It is to be appreciated that the amount of He-4 to add to each detector may vary. Also, some detectors may not receive any added He-4. The result, with He-4 added as needed to at least some of the detectors to achieve equal total amounts of helium within all of the detectors, is that the functional characteristics of the two total helium contents, except neutron sensitivity, are same as previously mentioned. Again recall that He-4 is electronically identical to He-3. With the functional equivalence being achieved, the method ends at step 308.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An arrangement for detecting neutrons, the arrangement including:
   a first detector including helium that includes at least some Helium-3; and
   a second detector including helium that includes at least some Helium-3 and at least some Helium-4, the amount of all helium of the second detector being the same as the amount of all helium in the first detector.

2. An arrangement as set forth in claim 1, including a third detector including helium that includes at least some Helium-4, the amount of all helium of the third detector being the same as the amount of all helium in each of the first and second detector.

3. An arrangement as set forth in claim 2, wherein the third detector includes some Helium-3.

4. An arrangement as set forth in claim 2, wherein the third detector includes no Helium-3.

5. An arrangement as set forth in claim 1, wherein the first detector includes some Helium-4.

6. An arrangement as set forth in claim 1, wherein the first detector includes no Helium-4.

7. A method for providing an arrangement for detecting neutrons, the arrangement including first and second detectors, the method including:
   providing the first detector with helium that includes at least some Helium-3; and
   providing the second detector with helium that includes at least some Helium-3 and at least some Helium-4 such that the amount of all helium of the second detector is the same as the amount of all helium in the first detector.

8. A method as set forth in claim 1, wherein the arrangement includes a third detector and the method includes providing the third detector with helium that includes at least some Helium-4, the amount of all helium of the third detector being the same as the amount of all helium in each of the first and second detector.

9. A method as set forth in claim 8, wherein the step of providing the third detector with helium includes providing third detector some Helium-3.

10. A method as set forth in claim 8, wherein the step of providing the third detector with helium includes providing third detector no Helium-3.

11. A method as set forth in claim 7, wherein the step of providing the first detector with helium includes providing the first detector with some Helium-4.

12. A method as set forth in claim 7, wherein the step of providing the first detector with helium includes providing the first detector with no Helium-4.

13. An arrangement for detecting neutrons, the arrangement including:
   a first detector including at least some Helium-3; and
   a second detector including at least some Helium-3 and at least some Helium-4;
   the neutron stopping power of the first and second detectors matching.

14. An arrangement as set forth in claim 13, wherein the first and second detectors have the same position resolution.

15. An arrangement as set forth in claim 13, wherein the amount of all helium of the second detector being the same as the amount of all helium in the first detector.

* * * * *